US012610937B2

(12) United States Patent
Grosse Prues

(10) Patent No.: US 12,610,937 B2
(45) Date of Patent: Apr. 28, 2026

(54) CONTROL AND/OR REGULATING SYSTEM FOR AN AGRICULTURAL DEVICE

(71) Applicant: Amazonen-Werke H. Dreyer SE & Co. KG, Hasbergen (DE)

(72) Inventor: Frank Grosse Prues, Bersenbrück (DE)

(73) Assignee: AMAZONEN-WERKE H. DREYER SE & CO. KG, Hasbergen (DE)

( * ) Notice: Subject to any disclaimer, the term of this patent is extended or adjusted under 35 U.S.C. 154(b) by 641 days.

(21) Appl. No.: 17/613,842

(22) PCT Filed: May 19, 2020

(86) PCT No.: PCT/EP2020/063892
§ 371 (c)(1),
(2) Date: Nov. 23, 2021

(87) PCT Pub. No.: WO2020/239519
PCT Pub. Date: Dec. 3, 2020

(65) Prior Publication Data
US 2022/0225602 A1 Jul. 21, 2022

(30) Foreign Application Priority Data
May 27, 2019 (DE) ..................... 10 2019 114 085.4

(51) Int. Cl.
*A01M 7/00* (2006.01)
*A01C 7/20* (2006.01)
*A01C 23/00* (2006.01)

(52) U.S. Cl.
CPC ........... *A01M 7/0057* (2013.01); *A01C 7/205* (2013.01); *A01C 23/007* (2013.01); *A01M 7/0089* (2013.01)

(58) Field of Classification Search
CPC .. A01M 7/0057; A01M 7/205; A01M 7/0089; A01C 23/007
See application file for complete search history.

(56) References Cited

U.S. PATENT DOCUMENTS

2016/0330948 A1* 11/2016 Schnaider ........... A01M 7/0085

FOREIGN PATENT DOCUMENTS

DE 102016116809 A1 3/2018
DE 102017104814 A1 * 9/2018 ........... A01C 23/007
(Continued)

OTHER PUBLICATIONS

International Search Report for International Application No. PCT/EP2020/063892 dated Aug. 4, 2020 and its translation.
(Continued)

*Primary Examiner* — Aaron L Troost
(74) *Attorney, Agent, or Firm* — Potomac Law Group, PLLC; John J. Penny

(57) ABSTRACT

A control and/or regulating system for an agricultural device includes a distributor linkage for spreading material, such as fertilizer, pesticide or seed, which extends transversely to the direction of travel and has a central part and two lateral arms connected to the central part with a plurality of arm sections which are foldable in towards one another in the transport position and foldable out in the working position and are connected by joints. At least one hydraulic device is associated with each arm. The hydraulic device comprises a hydraulic. The control and/or regulating system comprises a sensor device configured to detect a pressure change occurring at the respective hydraulic and a data processing unit configured to process signals of the sensor device and, on the basis thereof, to generate a control signal for the respective hydraulic device.

16 Claims, 8 Drawing Sheets

(56)     References Cited

FOREIGN PATENT DOCUMENTS

Figure 1:
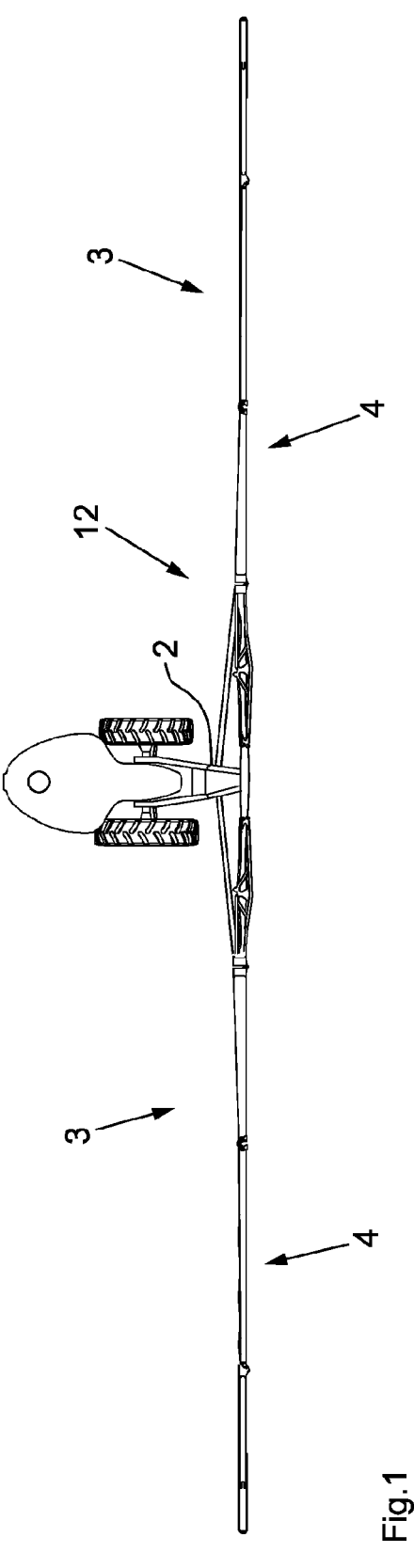

| DE | 102017114637 A1 | 12/2018 |
| EP | 2064948 B1 | 6/2009 |
| EP | 3337317 B1 | 6/2018 |
| EP | 3440934 A1 | 2/2019 |
| EP | 3449723 A1 | 3/2019 |

OTHER PUBLICATIONS

Written Opinion for International Application No. PCT/EP2020/
063892 dated Aug. 4, 2020 and its translation.
Office Action issued for EP 20 727 239.4 issued Dec. 18, 2024.
Office Action for Canadian Patent Application No. 3,141,491 issued
on Mar. 17, 2025.

* cited by examiner

CONTROL AND/OR REGULATING SYSTEM FOR AN AGRICULTURAL DEVICE

REFERENCE TO RELATED APPLICATIONS

This application is a 35 U.S.C. 371 national stage filing of International Application No. PCT/EP2020/063892, filed on May 19, 2020, which claims priority to German Application DE 10 2019 114 085.4, filed on May 27, 2019, the contents of which are hereby incorporated by reference.

The invention relates to a control and/or regulation system for an agricultural device. Furthermore, the invention relates to an agricultural device and to a method for controlling and/or regulating an agricultural device.

Such devices are used for agricultural machines for applying material, such as fertilizers, pesticides or seeds, for example for field sprayers. In order to spread the material over a large area and efficiently on the field soil to be worked, the agricultural devices have a distributor linkage with a plurality of spreading elements, such as spray nozzles. The distributor linkage extends transversely to the direction of travel and may have working widths of up to 40 m. The distance between the distributor linkage and the soil should remain as constant as possible over the entire working width of the distributor linkage. This means that the distributor linkage is kept as parallel as possible to the soil to be worked.

As is known, the distributor linkage has a central part, for example a centrally located frame, and two lateral arms connected to the central part with a plurality of arm sections, which are foldable in towards each other in the transport position and foldable out in the working position and are connected by joints. The individual arm sections may be pivoted about vertical axes by means of the associated joints and are mounted rotatably about the respective vertical axis. By means of the foldable arm sections, the distributor linkage may thus be transferred from a space-saving transport position to a working position. The transport position describes the folded-in state of the distributor linkage, in which the lateral arms are completely folded in towards the central part. In contrast, the working position describes the state of the distributor linkage, in which all arm sections are folded out. In other words, in the working position, the distributor linkage has the entire working width.

When operating an agricultural device with such a large working width, vibrations of the distributor linkage in or opposite to the direction of travel may occur, for example, due to driving over uneven ground, acceleration or braking of the device or a tractor pulling or carrying the implement. Due to such vibrations, very high forces may occur at the distributor linkage and a homogeneous material spread may no longer be guaranteed. It is therefore known from EP 2 829 177 B1, as an example, to arrange actuating and/or damping means between the central part and the arms, or between the arm sections, in such a way that the distributor linkage may be transferred from a transport position to a working position and vice versa, on the one hand, and that vibrations occurring at the distributor linkage in the direction of travel may be damped, on the other hand. The actuating and/or damping means may be configured, for example, as hydraulically operating cylinders. As a result of vibrations of the distributor linkage, pressure differences occur in the hydraulic cylinders.

In order to control the damping of the vibrations, the actuating and/or damping means may therefore be controlled by a data processing unit. For this purpose, the data processing unit evaluates the signals from several sensors arranged on the distributor linkage for position and speed monitoring of the agricultural device in order to generate a control signal for the hydraulic cylinders. By means of the sensors, such as radar sensors or pulse sensors, the current type of movement of the agricultural device is determined, i.e., it is determined whether the agricultural device is moving at a continuous speed or whether the agricultural device is accelerating or decelerating. The position monitoring of the distributor linkage may be accomplished by means of an angle sensor.

It is further known from DE 10 2017 104 814 A1 to take into account a pressure offset on a hydraulic cylinder when controlling the damping system.

In this context, the pressure offset is to be understood as a pressure difference that prevails between the pressure chambers of a hydraulic cylinder in the target position of the distributor linkage. The pressure offset takes into account external forces that are applied to the distributor linkage in the target position. Such forces may occur, for example, if the linkage is not mounted completely symmetrically. They may also occur on slopes or curves. The pressure offset may vary individually for the respective hydraulic cylinders of each hydraulic device in the system. The pressure offset is thus intended to take into account the forces actually applied to the distributor linkage in normal working operation, i.e. without any fluctuations occurring.

Thus, the result may be that the hydraulic device actually corrects only the vibrations occurring as described above, and acts to keep the system in the target position.

Such a pressure offset is specified as a fixed value in a known manner. For example, it may be calculated based on map data of the terrain to be worked, or it may be predetermined by the manufacturer of the agricultural device. The fixed value may, for example, be transferred to the control device by a user. This may be accomplished directly or by means of an external device, such as a computer or smartphone. However, this may be disadvantageous if the predefined value differs from the actual value, i.e. if there is a different pressure difference in the target position than the predefined pressure offset. The system will then try to control to the "wrong" value. In extreme cases, this may lead to the system continuously controlling in one direction in order to reach the "wrong" value, without ever being able to reach this value.

For example, if in reality a pressure difference of 35 bar is applied to the hydraulic cylinder in the target position, and a pressure offset of 30 bar is specified, the system will continuously try to reach the value of 30 bar. However, since this is not possible due to the external forces, the system will move the hydraulic cylinder in one direction to the maximum.

The invention is therefore based on the object of specifying a reliable control and/or regulating system for an agricultural device, in which precise damping of vibrations occurring in or opposite to the direction of travel may be obtained. Such vibrations are also referred to below as vibrations in the horizontal direction. In principle, this control system may also be used for vibrations in the vertical direction, i.e. vibrations about a horizontal axis.

This object is solved by a control and/or regulating system according to claim 1. Preferred embodiments are described in the dependent claims.

By the fact that according to the invention the pressure offset is determined by the control and/or regulation system based on processed signals of the sensor device, the pressure offset is prevented from not reflecting the actual conditions during operation of the agricultural device. In particular, the signals from the sensor device may be used herein to monitor a pressure progression at the hydraulic device during operation. This pressure progression will generally have a "quasi-static" component as well as a "dynamic" component. The quasi-static component is a value that changes only slowly, if at all. The dynamic component, on the other hand, consists of fluctuations that occur around the value of the static component, for example due to the vibrations described above. The fluctuations of the dynamic component occur on a short time scale compared to changes of the quasi-static component. For example, a typical time scale for a change in the quasi-static component is several tens of seconds, while changes in the dynamic component occur on a time scale of 1 second or less.

In other words, the quasi-static component represents the pressure offset at the target position. Thus, the control and/or regulation system according to the invention is used to determine the actual pressure offset during operation of the agricultural device. This ensures that the system always controls the hydraulic device while taking into account the forces actually occurring on the implement due to vibrations.

The sensor device may include one or more sensors. The sensors may be configured as pressure sensors for direct pressure measurement, in particular as pressure transducers. Such a configuration as a pressure sensor has the advantage that both a relative pressure and an absolute pressure may be determined hereby. Furthermore, the sensors may preferably be configured as differential pressure transmitters for determining a differential pressure or an occurring pressure difference. Advantageously, the pressure transmitters may detect the pressure to be measured via a measuring membrane, which is mechanically deformed as a function of the respective pressure. This mechanical change is measured electronically, output as an analog or digital output signal and transmitted to the data processing unit. The sensor device may also include a combination of sensors of different types.

In the target position, the distributor linkage may be in the working position described above. In particular, the target position of the distributor linkage is characterized by the fact that no, or as little as possible, relative movement occurs between the central part and the distributor linkage itself, in particular in the direction of travel. In particular, there is no, or as little as possible, relative movement in the target position due to vibrations of the distributor linkage, especially in the direction of travel. It should be noted that the target position is an idealized position that, by active damping, cannot be achieved constantly or can be achieved only briefly during operation.

For determining the pressure offset the signals from the sensor device may be processed by filtering them using a low-pass filter. This represents an easy-to-implement option for extracting the quasi-static component from the signals. In particular, the low-pass filter may be implemented as a PT1 element. The value of a time constant of the low pass filter may be between 10 seconds and 60 seconds, preferably between 20 seconds and 40 seconds.

The sensor device may comprise a first sensor and a second sensor. In this case, the first sensor may be configured to sense a first pressure associated with a pressure on a side of an annular surface of the hydraulic cylinder, and the second sensor may be configured to sense a second pressure associated with a pressure on a side of a piston surface of the hydraulic cylinder. This has the advantage that a differential pressure, in particular the pressure offset, prevailing at the hydraulic cylinder may be precisely determined. The first and second sensors may be configured as described above.

The data processing unit may be configured to process the signals from the first sensor and the second sensor, in particular taking into account the ratio of the ring surface area and the piston surface area of the hydraulic cylinder, in order to generate the control signal for the respective hydraulic device. Since forces acting on the hydraulic cylinder are determined by the respective pressures and surface areas on the piston side and ring side of the hydraulic cylinder, the respective pressures are normalized with respect to each other by taking the area ratio into account, which simplifies further processing of the values.

The data processing unit may be further configured to determine a plurality of pressure difference values based on the signals from the first sensor and the second sensor, taking into account the ratio of the ring surface area and the piston surface area of the hydraulic cylinder. The data processing unit may be configured to determine pressure difference values at a time interval of 5 ms to 1 s, preferably at a time interval of 5 ms to 100 ms. Moreover, it may be configured to apply a filter, in particular a low-pass filter, to the plurality of pressure difference values, and to determine the pressure offset based on the filtered pressure difference values. In this manner, the pressure offset may be accurately determined during operation of the agricultural device.

The respective hydraulic device may further include a hydraulic line connected to the hydraulic cylinder for supplying and discharging hydraulic fluid, and at least one hydraulic valve unit for controlling the hydraulic pressure, the valve unit being controllable by a control signal from the data processing unit.

The hydraulic device may generally be configured as an actuator to convert the electrical control signals of the data processing unit into a mechanical movement and thus both to transfer the distributor linkage from a transport position to a working position and to ensure damping of vibrations occurring at the distributor linkage in the direction of travel. The hydraulic valve unit advantageously provides safe and fast-acting overload protection for the hydraulic cylinder. Overall, the hydraulic pressure at the hydraulic cylinder may be adjusted by means of the hydraulic valve unit, which may be controlled by the data processing unit by means of a control signal.

The hydraulic line connected to the respective hydraulic cylinder may be in communication with at least one hydraulic accumulator. It is conceivable that the control and/or regulating system includes a central hydraulic accumulator, or alternatively one hydraulic accumulator is associated with the right-hand side or left-hand side arm of the distributor linkage, respectively. Advantageously, the hydraulic pressure acting in the hydraulic cylinder is generated by the hydraulic accumulator.

It is possible for the hydraulic devices associated with the respective arm to form a closed hydraulic circuit, with the hydraulic cylinders of the hydraulic devices being connected by means of a common hydraulic line. Ideally, the attachment of individual separate hydraulic lines may thus be dispensed with. Furthermore, in this case, a sensor of the sensor device for determining a pressure change occurring at the hydraulic devices may also be attached to the common hydraulic line.

The at least one hydraulic valve unit may be formed by a proportional valve. In particular, it may be a 4-way valve. It may also be a 2-way valve. Exemplarily, the hydraulic valve unit may also be formed by a pressure control valve or other circuitry for changing the applied hydraulic pressure in the hydraulic device.

Further, the hydraulic valve unit may be adjustable in an electronically controlled manner based on a known characteristic curve. Here, the characteristic curve of the valve unit generally reflects the functional dependence of the output signal on the input signal. Ideally, the output signal changes linearly with the pressure occurring as the input signal. The ideal characteristic curve would therefore be a straight line. However, the measured, or in other words the real characteristic curve of the hydraulic valve unit cannot be exactly linear, but even at the starting point and end point of the pressure range, the output signals may deviate from the respective ideal values. It is therefore advantageous for precise adaptation of the damping of vibrations occurring at the distributor linkage to adjust the hydraulic valve unit on the basis of its characteristic curve and therefore to adapt it to the momentary pressure change and to counteract it. For example, the pressure sensors may be used to determine, on the basis of the characteristic curve of the valve unit, how large the required control flow must be switched to the valve unit in order to counteract the pressure change that occurs.

Further, the first sensor may be configured to sense a pressure associated with a common pressure on the side of the ring surface areas of all hydraulic cylinders in the system. For example, the first sensor may be configured to sense pressure in a hydraulic line of the system that supplies hydraulic fluid to the ring side chambers of all hydraulic cylinders of the system. Such an arrangement simplifies the system by reducing the total number of sensors required. Therefore, such a system is also less expensive.

The control and/or regulating system may further include other sensors on the distributor linkage configured to determine a rotation about a folding axis and/or a position of an arm section and/or arm, wherein the data processing unit is configured to generate the control signal based on the determined rotation and/or position. These sensors may, for example, take the form of potentiometers. In this case, the potentiometer determines whether an individual arm section or even the entire arm is deflected from its target position and how its position, or attitude, changes. The deflection may occur, for example, due to a vibration. It may also occur due to the vibration damping described above. The folding axis about which the arm folding is performed is preferably vertically oriented, but has at least one vertical component. In this case, the data processing unit may perform a target/actual value comparison with regard to the folding axis and, based on the control difference and in combination with the pressure offset and the measurement of the pressure change occurring at the hydraulic device, adjust the hydraulic valve unit. The combination of different measured values in the data processing unit enables very precise adjustment of the hydraulic valve unit. Likewise, any measurement inaccuracies that occur may be compensated for.

The data processing unit, together with the sensor device and the respective hydraulic devices, may be configured as a unit. This implies a direct connection, for example via cable lines or wirelessly, between the sensor unit and the data processing unit, as well as the hydraulic device. Therefore, the measurement signal detected by the sensor device may be transmitted efficiently and as quickly as possible to the hydraulic device for vibration damping via a control signal from the data processing unit.

Overall, based on the measurement signal of the sensor device and/or the current position of the arm section or the arm, the associated hydraulic valve unit of the hydraulic device for damping vibrations occurring at the distributor linkage may be controlled, or adjusted, by the data processing unit. It is generally conceivable to also use the measured signals of the sensor device in a control system as an actual value and for adjusting a target value. In this case, the data processing unit may be configured, or in other words have such a control and/or evaluation program, in such a way that, based on the measured signal of the sensor device as input variable for the control, a corresponding target value for the respective hydraulic device is determined, and the hydraulic device is controlled or adjusted to the target value accordingly.

Furthermore, the at least one hydraulic valve unit of the respective hydraulic device of the one arm may be adjustable and/or adjustable by the control and/or regulating system independently of the hydraulic valve unit of the respective hydraulic device of the other arm. This means that the hydraulic valve unit of the associated hydraulic device of the respective arm may be controlled independently via an electronic signal from the data processing unit.

Therefore, the control and/or regulation system may be efficiently used for symmetrical, as well as for asymmetrical distributor linkages.

The invention further provides an agricultural device for spreading material, such as fertilizer, pesticide or seed, including a control and/or regulating system. The control and/or regulating system may thereby include one or more of the features described above. In particular, the agricultural device may be a field sprayer. The field sprayer may be self-propelled. It may also be a trailed or carried field sprayer.

The invention further provides a method for controlling and/or regulating an agricultural device. The agricultural device has a distributor linkage for spreading material, such as fertilizer, pesticide or seed, which extends transversely to the direction of travel, and has a central part and two lateral arms connected to the central part and having a plurality of arm sections which are foldable in or retractable towards one another in the transport position and foldable out in the working position and are connected by joints. Here, at least one hydraulic device is associated with each arm. The respective hydraulic device is furthermore controllable for damping vibrations occurring at the arm in horizontal and/or vertical direction, and the respective hydraulic device includes a hydraulic cylinder, in particular a double-acting hydraulic cylinder. The method thereby includes the following steps:

Detecting, by a sensor device, a pressure change occurring at the respective hydraulic device due to vibrations of the distributor linkage in the horizontal and/or vertical direction.

Generating, on the basis of the detected pressure change, a control signal for the respective hydraulic device, wherein the control signal is generated taking into account a pressure offset corresponding to a pressure difference between a ring surface area and a piston surface area of the hydraulic cylinder in a target position of the distributor linkage, wherein the pressure offset is determined based on processed signals of the sensor device.

In this regard, the method may process the signals from the sensor device by filtering them using a low-pass filter.

The method may further include the steps of:

Detecting a first pressure associated with a pressure on the side of a ring surface area of the hydraulic cylinder.

Detecting a second pressure associated with a pressure on the side of a piston surface area of the hydraulic cylinder.

Processing the first pressure and the second pressure taking into account the ratio of the ring surface area and the piston surface area of the hydraulic cylinder.

Generating the control signal for the respective hydraulic device based on the processed pressure values.

Additionally, the method may include the steps of:

Determining a plurality of pressure difference values based on the first pressure and the second pressure, taking into account the ratio of the ring surface area and the piston surface area of the hydraulic cylinder.

Applying a filter, in particular a low pass filter, to the plurality of pressure difference values.

Determining the pressure offset based on the filtered plurality of pressure difference values.

In the method, the first pressure may be associated with a common pressure on the side of the ring surface areas of all hydraulic cylinders of the system.

The method may further include the steps of:

Determining a rotation about a folding axis and/or a position of an arm section and/or arm.

Generating the control signal based on the determined rotation and/or position.

The control system may include one or more of the features described above.

Figure 2:
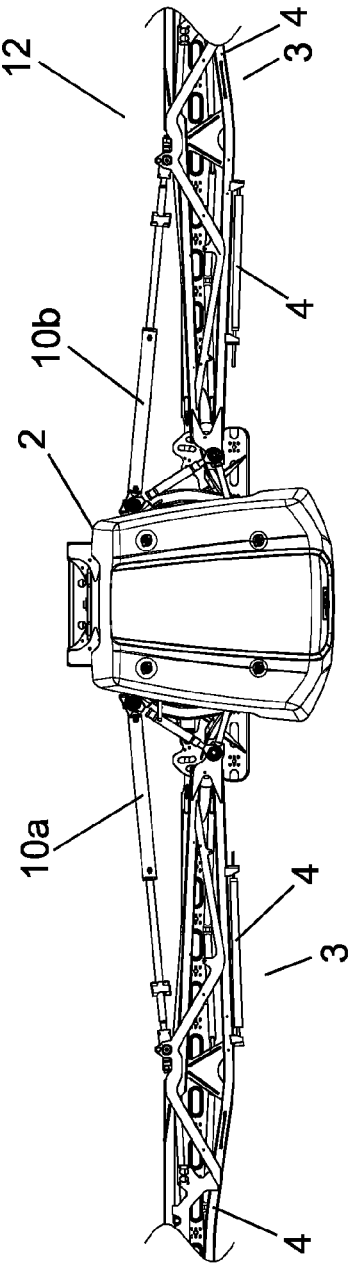
Figure 3:
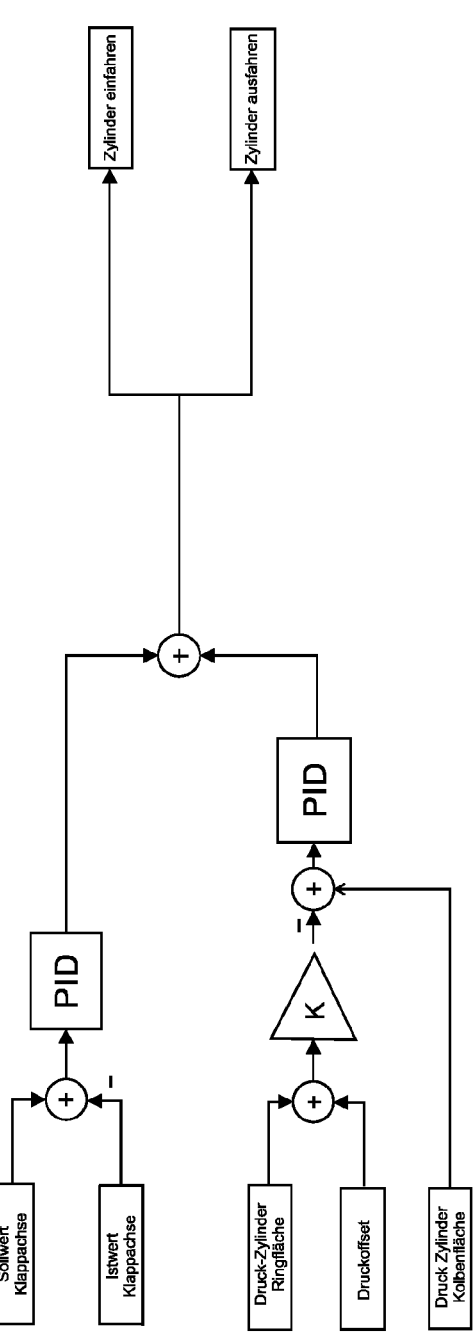
Figure 4:
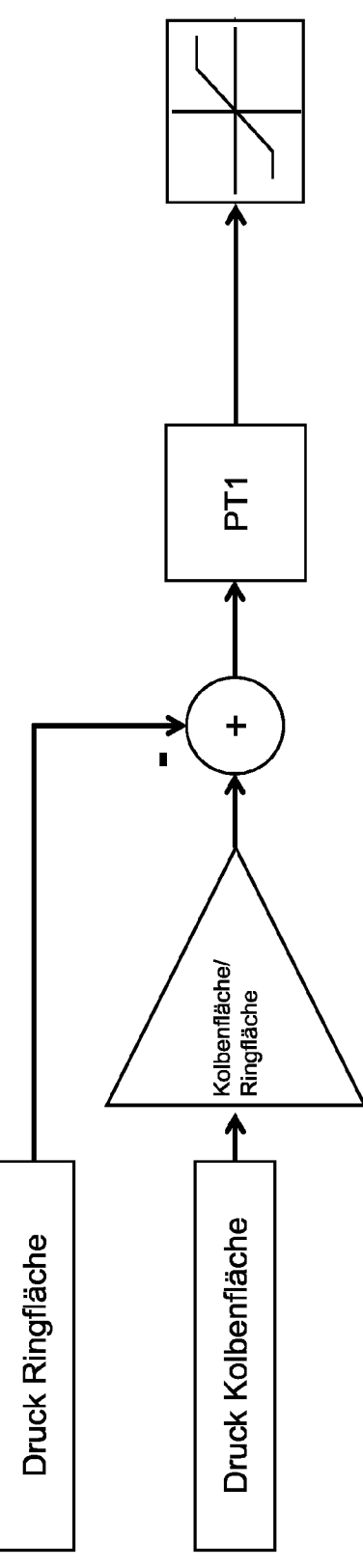
Figure 5:
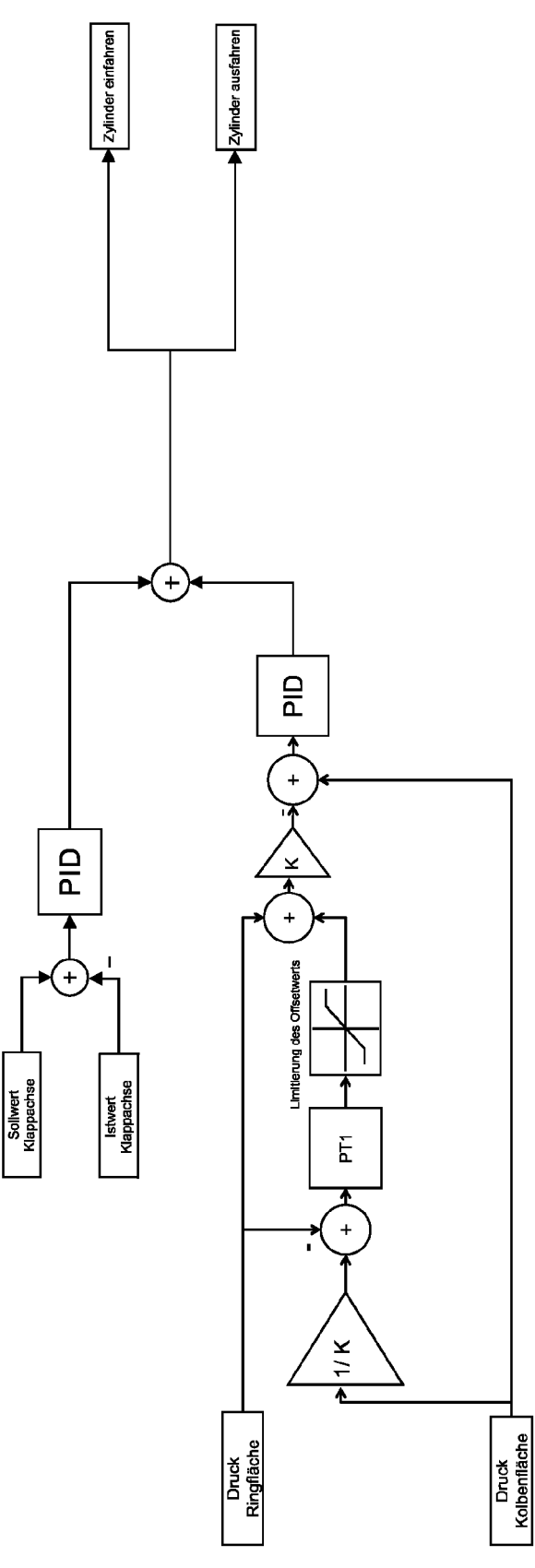
Figure 6:
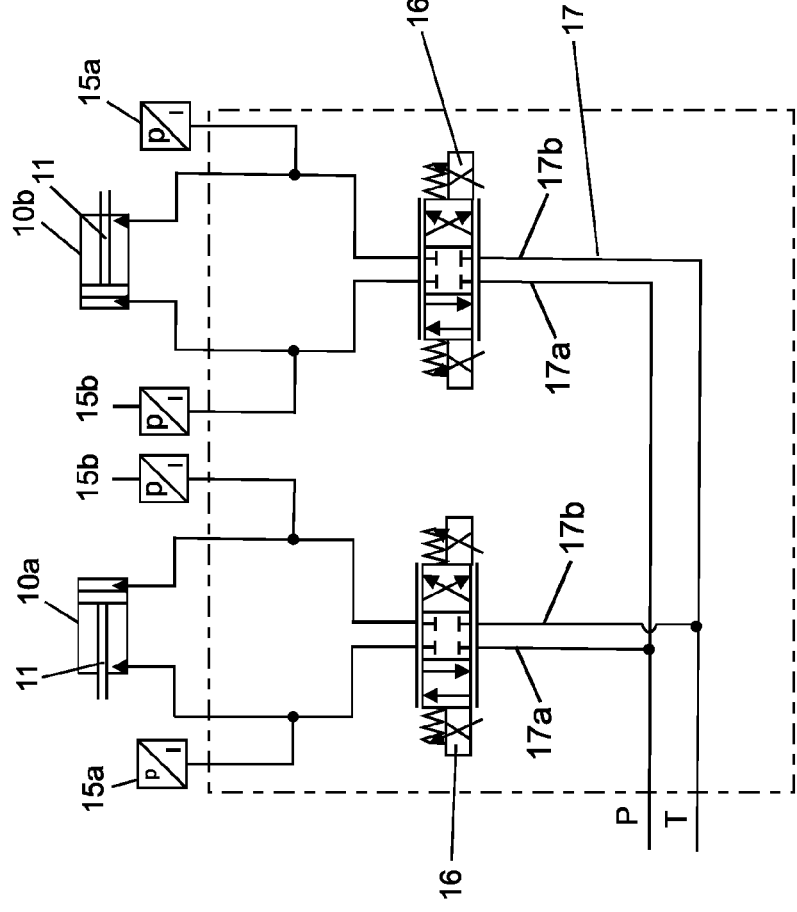
Figure 7:
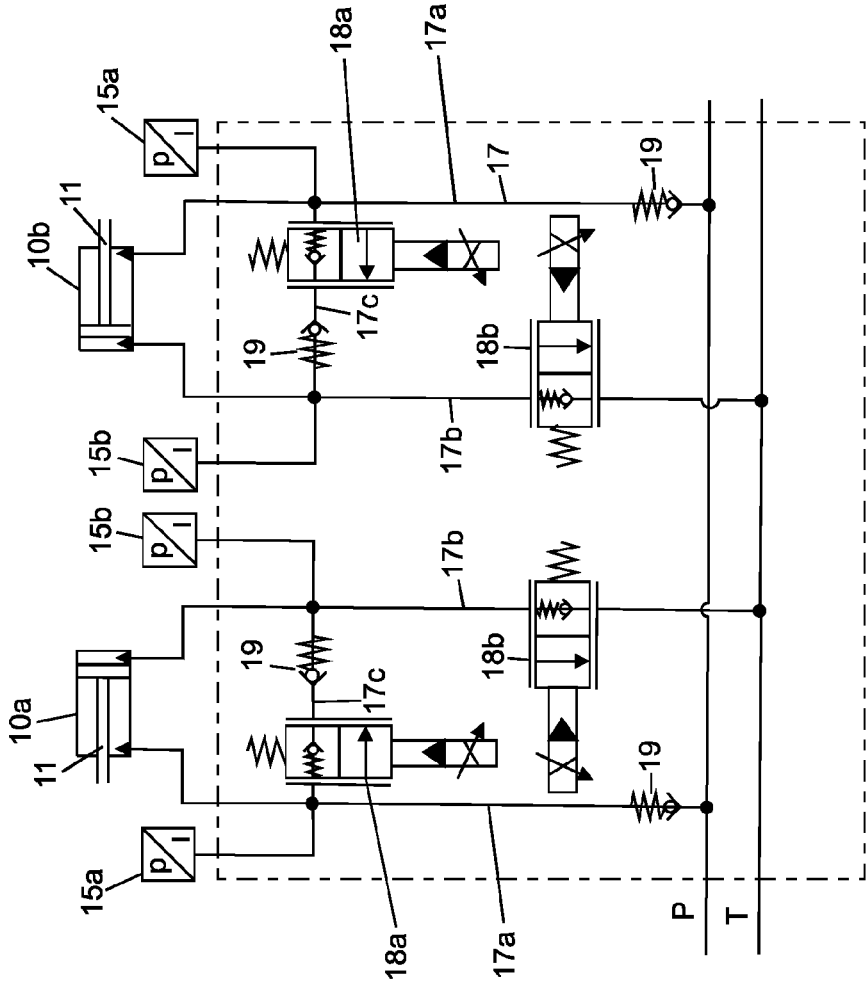
Figure 8:
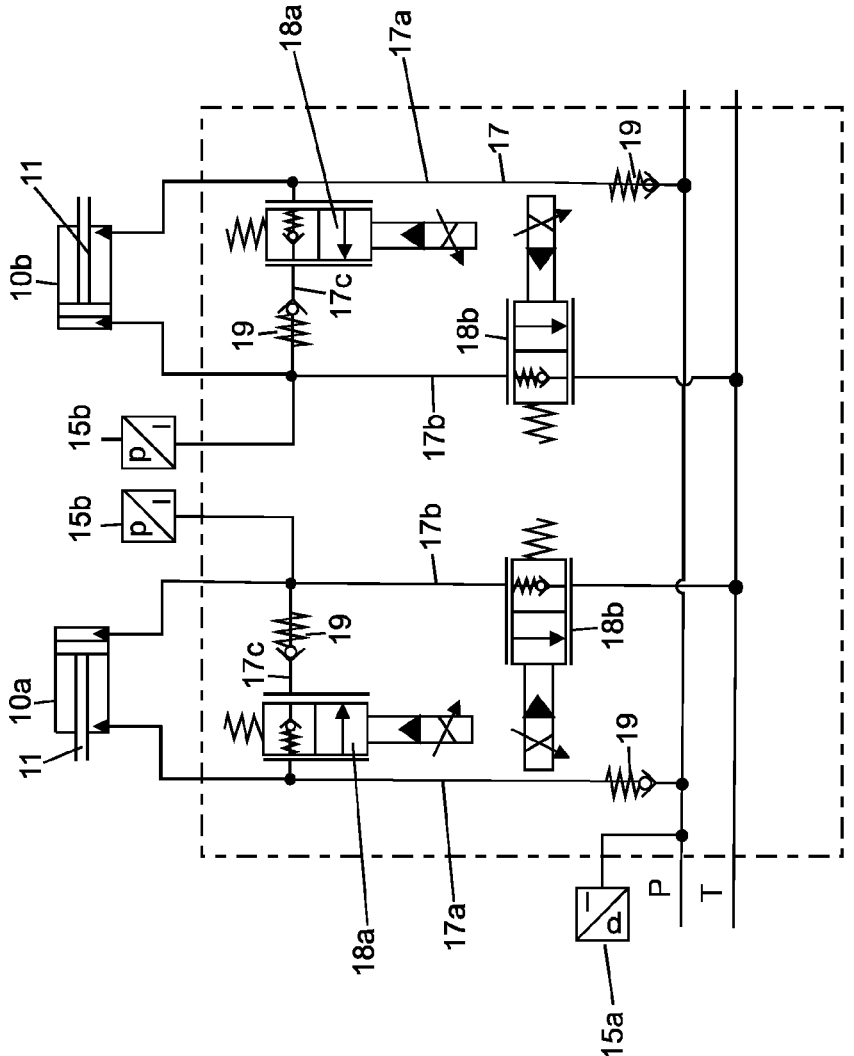

Further features and advantages of the invention are explained below with reference to the exemplary figures. Thereby:

FIG. 1 schematically shows a distributor linkage with a control and/or regulating system and with a central part and two lateral arm connected to the central part in plan view;

FIG. 2 schematically shows a detailed view of a distributor linkage with a control and/or regulating system and with a central part and two lateral arms connected to the central part;

FIG. 3 schematically shows a control circuit diagram for a control and/or regulating system;

FIG. 4 schematically shows a method for determining a pressure offset;

FIG. 5 schematically shows a control circuit diagram for a control and/or regulating system;

FIG. 6 schematically shows a hydraulic circuit diagram for a control and/or regulating system according to an embodiment;

FIG. 7 schematically shows a hydraulic circuit diagram for a control and/or regulating system according to a further embodiment; and FIG. 8 schematically shows a hydraulic circuit diagram for a control and/or regulating system according to a further embodiment.

FIG. 1 schematically shows a distributor linkage 12 for use with a control and/or regulating system according to the invention for an agricultural device in plan view. The agricultural device is designed here as a field sprayer. The distributor linkage 12 is used to apply material, such as fertilizer, pesticide or seed, and extends transversely to the direction of travel. The distributor linkage 12 has a central part 2 and two lateral arms 3 connected to the central part 2, with a plurality of arm sections 4 which can be folded in or retracted towards one another in the transport position and folded out or extended in the working position and are connected by joints.

FIG. 2 schematically shows a detailed view of the distributor linkage 12 shown in FIG. 1. It is shown that a respective hydraulic cylinder 10a, b is associated with the right and left arms 3, respectively, which is connected to the central part 2 and the respective arm 3. By means of the respective hydraulic cylinder 10a, b, the respective arm 3 and thus the distributor linkage 12 may be transferred from a transport position to a working position. In doing so, the hydraulic cylinders 10a, b fold the distributor linkage 12 around vertical axes into working and transport positions, respectively. In order to move the arm completely from the transport position to the working position, further devices may be provided which are not shown in FIG. 1 and FIG. 2. For example, each arm section 4 may be associated with a further hydraulic cylinder that may fold the respective arm section 4 in and/or out.

Sensors not shown may be mounted in the vicinity of the hydraulic cylinders 10a, b for detecting the working position of the distributor linkage. Exemplarily, the sensors may be provided as potentiometers. This allows the position or working positions of the piston rod of the hydraulic cylinder to be determined. A corresponding measurement or position signal may be transmitted via a data line to a data processing unit not shown, which controls the folding process of the arm sections based on the measurement signal. The data processing unit is configured here in such a way that the signals from the sensors may be processed and a control signal for the hydraulic cylinders may be generated on their basis. Thus, by means of the potentiometers for position detection, the process of unfolding of the distributor linkage may be detected.

When the distributor linkage is in the working position, or in other words when it is completely unfolded, any vibrations occurring at the distributor linkage may be damped by the hydraulic cylinders 10a, b by means of the open-loop and/or closed-loop control system, and the distributor linkage 12 may be kept as close as possible to its target position. The target position of the distributor linkage 12 is characterized, as described further above, by the fact that no relative movement occurs between the tractor vehicle carrying the distributor linkage, and the distributor linkage itself, in particular in the direction of travel. Since this is an idealized position that relates to the entire distributor linkage, it is possible in this case for individual areas of the distributor linkage to move more with active vibration damping than would be the case without vibration damping. For example, vibrations may occur at an outer end of the distributor linkage due to the elasticity of the arms. These vibrations may be eliminated or reduced by means of the control and/or regulation system. However, due to the actuation of the hydraulic cylinders, this may be associated with a movement of the distributor linkage near the central part. In other words, active vibration damping may result in slightly higher deviations from the target position in the middle of the distributor linkage in favor of significantly lower vibration amplitudes at the end of an arm.

The control and/or regulating system includes sensors not shown here, which are designed in such a way that a pressure change may be determined that occurs at the hydraulic cylinders 10a, b as a result of vibrations of the distributor linkage 12. In particular, a pressure difference at the respective hydraulic cylinder 10a, b may be measured by means of the sensors 15a, b, which are preferably configured as pressure sensors. Based on the measurement signals of the pressure sensors, the data processing unit may control a hydraulic valve unit not shown that is associated with the respective hydraulic cylinder 10a, b, whereby pressure compensation and thus damping of the vibrations that occur may be achieved.

FIG. 3 shows a block diagram of a possible version of a control and evaluation program of a data processing unit according to FIG. 1. Here, measurement signals from several sensors, which may be arranged on the distributor linkage 12 according to FIG. 1, may be transmitted as input variables to the control and evaluation program. For example, the actual value of the rotation about the folding axis of the associated arm section 4 and/or arm 3, or in other words its deflection from the rest position, or the current position may be determined via a potentiometer and compared with a target value. The difference or the control deviation between the actual value and the target value of the rotation around the folding axis of the arm section 4 and/or arm 3 may be adjusted by means of a PID controller (proportional-integral-derivative—controller).

Furthermore, pressure sensors 15*a, b* may be used to determine the pressure at the ring surface area and at the piston surface area of a hydraulic cylinder 10*a, b* for transferring the distributor linkage 12 from a transport position to a working position and for damping vibrations occurring at the distributor linkage 12. In other words, by means of the pressure sensors 15*a* pressure change occurring at the hydraulic cylinders 10*a, b* may be determined. When measuring the pressure at the ring surface area, a pressure offset, i.e. a pressure difference, which may occur due to an external force in the target position of the distributor linkage 12, may already be compensated for by using it as an input variable for the control and evaluation program. This pressure offset, for example, may result due to a pitching inclination of the agricultural device occurring in or opposite to the direction of travel. Such a pitching tendency of the device may be taken into account, for example, via correspondingly arranged sensors on the device or also via the map data of the field soil to be driven over. Advantageously, the pressure offset may be determined dynamically during operation of the agricultural device. An exemplary method for such a determination of the pressure offset is described further below in connection with FIG. 4.

Advantageously, the ratio K between the ring and piston surface areas of the hydraulic cylinder 10*a, b* is to be taken into account to compensate for the difference in area between the two cylinder chambers of the hydraulic cylinder 10*a, b*. As an example, a pressure of 90 bar may be measured at the ring surface area of the hydraulic cylinder 10*a, b*. The piston surface area is usually larger than the ring surface area by a factor K, for example by a factor of 2. Accordingly, a smaller pressure would prevail at the piston surface area than at the ring surface area, for instance 45 bar. If the difference between the two measured values corrected with the ratio of ring and piston surface areas should equal zero, taking into account the pressure offset, the control and evaluation program does not output an output signal for an adjustment of the hydraulic cylinder 10*a, b*. In this case, the adjustment of the hydraulic cylinder 10*a, b* takes place. Then, the adjustment of the hydraulic cylinder 10*a, b* is performed only due to the control of the position of the arm section 4 and/or arm 3. Should the difference of the corrected pressures differ from zero, an external force acts on the distributor linkage 12 and the control and evaluation program may output a control signal for the hydraulic cylinder 10*a, b* by means of a PID controller.

In order to generate the control signal for the hydraulic cylinder 10*a, b*, the signals from the potentiometer may be combined with the signals from the pressure sensors 15*a, b*. Depending on the control deviation, an output signal for the valve opening for setting the hydraulic pressure at the hydraulic cylinder 10*a, b* may be generated on the basis of the characteristic curve of a hydraulic valve unit assigned to the hydraulic cylinder 10*a, b*. The output signal for the hydraulic cylinder 10*a, b* may be generated on the basis of the characteristic curve of the hydraulic valve unit assigned to the hydraulic cylinder 10*a, b*. In doing so, the characteristic curve may be used to determine a conversion for the valve flow required for folding and unfolding or for retracting and extending the cylinder. Thus, based on the signals from the sensors, a precise control signal for the hydraulic cylinder 10*a, b* may be generated for damping vibrations occurring at the distributor linkage 12.

FIG. 4 illustrates a method by means of which a pressure offset may be determined, or adjusted, during operation of the agricultural device. In particular, this may be the pressure offset referred to in FIG. 3. As described further above, a pressure difference between the pressure sensors 15*a, b* may be determined. Preferably, this is done by including the piston and ring surface areas of the hydraulic cylinders 10*a, b*, as described above. Preferably, a plurality of temporally successive pressure difference values are processed by the data processing unit in such a way that a "quasi-static" pressure difference component may be determined, i.e. a component that changes only slowly, if at all. Since in the target position, as explained above, there is no relative movement between the tractor vehicle carrying the distributor linkage and the distributor linkage itself, in particular in the direction of travel, i.e. a static situation exists, the quasi-static pressure component then corresponds to the pressure offset sought. In the method illustrated in FIG. 3, the quasi-static pressure component is determined by filtering the pressure difference values using a low-pass filter. The low-pass filter is implemented here as a PT1 element. The PT1 element has a time constant of 30 seconds, for example. However, the time constant may also be greater or less depending on the type of application.

The output value of the filter may then be used directly as a pressure offset. It is also possible to average several output values, and use the averaged value as the pressure offset. The pressure offset may then be used in the control and/or regulating operation as illustrated, for example, in FIG. 3. In FIG. 4, it is further indicated that the value of the pressure offset may be limited. For example, the value may be limited based on the sensors sensing the angular position of the distributor linkage. This may be necessary because the measured pressure difference in a position of the distributor linkage that does not correspond to the working position may differ from the sought pressure offset. For example, the target value of rotation about the folding axis of the arm section 4 and/or arm 3 between an arm and the direction of travel mentioned further above may be 90°. If the actual value deviates from this value, the system will adjust the difference between the actual value and the target value by means of a PID (proportional-integral-derivative—controller) controller, as described above. Since there may be additional pressure on the hydraulic cylinder during this process, it is possible that an incorrect pressure offset could be determined that would cause the hydraulic device to actively counteract the adjustment of rotation. This may be prevented by restricting the pressure offset as described.

FIG. 5 shows a possible execution of a control and evaluation program. Compared to the version illustrated in FIG. 3, the determination of the pressure offset described with reference to FIG. 4 is implemented directly here.

FIGS. 6 to 8 show schematic representations of a hydraulic circuit diagram for a control and/or regulation system. Various hydraulic circuit diagrams are shown by way of example. It is noted that other components may be present but are not shown for the simple schematic arrangement in the Figures.

FIG. 6 shows a hydraulic circuit diagram for a hydraulic device according to an embodiment of the invention for pressurizing the right and left hydraulic cylinders 10a, b according to FIG. 1 for transferring the distributor linkage from a transport position to a working position and for adjusting the damping of vibrations occurring at the distributor linkage in the direction of travel. The right and left hydraulic cylinders 10a, b are exemplarily configured as double-acting hydraulic cylinders. The hydraulic cylinders 10a, b are connected to the distributor linkage according to FIG. 1 as described above. The hydraulic cylinders 10a, b are connected to a hydraulic reservoir not shown via the hydraulic line 17. The hydraulic reservoir contains a hydraulic fluid which may be supplied to the respective hydraulic cylinder 10a, b via the hydraulic line 17. Here, the hydraulic line 17 is formed by a pressure line, which is marked in the Figures with the reference sign P, and a hydraulic reservoir line, which is marked with the reference sign T. The hydraulic reservoir is connected to the right-hand and left-hand hydraulic cylinders 10a, b. The hydraulic reservoir is not shown.

Two pressure sensors 15a, b are associated with the right and left hydraulic cylinders 10a, b, respectively. The two pressure sensors 15a, b are associated with the hydraulic cylinder in such a way that both a pressure on a piston surface area and on a ring surface area of the hydraulic cylinder 10a, b may be determined. The hydraulic cylinder 10a, b has two differently sized effective surface areas on the two sides of the piston 11. The effective surface area of the hydraulic cylinder facing the piston rod is smaller than the effective surface area facing away from the piston rod. Accordingly, the pressure sensor 15a on the ring surface area measures a different, in particular greater, pressure than the pressure sensor 15b on the piston surface area.

The pressure sensors 15a, b are connected to a supply line 17a and a discharge line 17b of the respective hydraulic cylinder 10a, b for measuring the pressure at the ring surface area and piston surface area of the hydraulic cylinder 10a, b. In the context of the application, the supply line 17a of the hydraulic line 17 describes that section of the hydraulic line 17 which connects the hydraulic reservoir, which is not shown, to the ring surface area of the hydraulic cylinder 10a, b. In contrast, within the scope of the application, the discharge line 17b of the hydraulic line 17 describes that section of the hydraulic line 17 which connects the hydraulic reservoir to the piston surface area of the hydraulic cylinder 10a, b.

The pressure sensors 15a, b are here exemplarily configured as pressure transducers. The pressure transducer generally represents an electrical transducer for measuring the existing pressure in the hydraulic cylinder 10a, b. Thus, a pressure change occurring due to vibrations of the distributor linkage may be determined by means of the pressure sensor. By way of example, a pressure difference at the hydraulic cylinder 10a, b and thus at the hydraulic device may be measured by means of the pressure transducers 15a, b.

Furthermore, a hydraulic valve unit is associated with each hydraulic cylinder 10a, b for controlling the hydraulic pressure. Here, the hydraulic valve unit is arranged in the hydraulic line 17 and is exemplarily configured as a proportional valve 16, or in other words as a multi-way valve. The pressure sensors 15a, b associated with the respective hydraulic cylinder 10 a, b are arranged on the supply line 17a and discharge line 17b between the hydraulic cylinder 10a, b and the associated proportional valve 16. In particular, the proportional valve 16 is configured as a 4/3-way valve. The proportional valve 16 may be controlled and adjusted by a data processing unit not shown. For this purpose, the proportional valve 16 is connected to the data processing unit, for example, via cable lines or wirelessly. The data processing unit is further connected to the pressure sensors 15a, b. Based on the signals detected by the pressure sensors 15a, b, the data processing unit may control the proportional valve 16. Specifically, the proportional valve 16 associated with the respective hydraulic cylinder 10a, b may be actuated for pressure compensation based on the values determined by the pressure sensors 15a, b. In the rest position of the proportional valve 16, the valve is preferably closed, or in other words in a central position. The valve may be deflected to the left or right via the data processing unit. By deflecting the valve, the pressure at the ring surface area or the piston surface area of the hydraulic cylinder may be increased or decreased by means of the proportional valve, or in other words, the piston of the hydraulic cylinder 10a, b may be retracted or extended.

In this case, the data processing unit, the pressure sensors 15a, b and the hydraulic valve unit 16 of the hydraulic device form a single unit. Thus, based on the signals determined by the pressure sensors 15a, b, by means of the data processing unit and the proportional valves for pressure compensation in the hydraulic cylinders 10a, b, damping of vibrations occurring at the distributor linkage may take place.

FIG. 7 shows a further schematic representation of a hydraulic circuit diagram for a control and/or regulating system according to the invention in accordance with a further embodiment. As described with reference to FIG. 6, the right-hand and left-hand hydraulic cylinders 10a, b for folding the right-hand and left-hand arms 3 of the distributor linkage 12 according to FIG. 2 and for damping vibrations occurring at the distributor linkage 12 are designed, as an example, as double-acting hydraulic cylinders 10a, b and are connected to a hydraulic line 17. For measuring the hydraulic pressure at the ring and piston surface areas of the respective hydraulic cylinder 10a, b, two pressure sensors 15a, b are associated with each hydraulic cylinder 10a, b as described with reference to FIG. 6.

In the respective supply line 17a of the hydraulic line 17 into the respective hydraulic cylinder 10a, b, a shut-off valve 19 may be arranged between the hydraulic reservoir not shown and the respective hydraulic cylinder 10a, b. The shut-off valve 19 may be configured as a check valve and may be loaded with a spring. By means of the shut-off valve 19, the flow may be shut off in one direction and released in the opposite direction. Accordingly, hydraulic pressure may be continuously applied to the ring surface area of the respective hydraulic cylinder 10a, b.

In the respective discharge line 17b of the respective hydraulic cylinder 10a, b, a multi-way valve 18b is arranged. The hydraulic pressure is measured by the pressure sensor 15b between the hydraulic cylinder 10a, b and the multi-way valve 18b. The multi-way valve 18b may thereby be controlled electronically via the data processing unit for pressure compensation based on the measurement signals from the pressure sensor 15a, b.

The supply line 17a and the discharge line 17b are connected by means of an additional intermediate line 17c. A further multi-way valve 18a is arranged in the intermediate line 17c. The multi-way valve 18a may thereby be controlled electronically by means of the data processing unit. Furthermore, a shut-off valve 19 may be arranged on the side of the multi-way valve 18*a* facing the discharge line 17*b*.

The two multi-way valves 18*a* serve to connect the ring and piston surface areas of the respective hydraulic cylinder 10*a, b*. To extend the hydraulic cylinder 10*a, b*, the ring and piston surface areas are connected to each other, or the hydraulic cylinder extends via the relatively larger area of the piston surface area. In other words, when the respective multi-way valve 18*a* is actuated by the data processing unit, the respective hydraulic cylinder 10*a, b* can extend.

The retraction of the respective hydraulic cylinder 10*a, b* may be achieved by means of the multi-way valve 18*b* associated with the respective hydraulic cylinder 10*a, b*. When the multi-way valve 18*b* is driven by the data processing unit, hydraulic fluid may be discharged on the piston side of the hydraulic cylinder 10*a, b*. Accordingly, due to the continuous supply of hydraulic pressure to the ring surface area of the hydraulic cylinder 10*a, b*, the hydraulic cylinder 10*a, b* can retract.

To ensure that identical forces may be generated when the hydraulic cylinder 10*a, b* retracts and extends, the ratio between the ring surface area and the piston surface area should ideally be 1:2. Thus, based on the values measured by the pressure sensors 15*a, b*, which are evaluated and processed by the data processing unit, the retraction and extension of the hydraulic cylinder 10*a, b* may be efficiently controlled via the electronically controlled retraction and extension of the two multi-way valves 18*a, b*.

FIG. 8 shows another schematic diagram of a hydraulic circuit diagram for a control and/or regulating system of the invention in accordance with a third embodiment. The basic structure and operation of the individual components of the hydraulic circuit diagram are as described with reference to FIG. 7. In contrast to FIG. 6, only a single pressure sensor 15*a* is arranged in the hydraulic line 17 for measuring the pressure at the ring surface areas of both hydraulic cylinders 10*a, b*. Accordingly, the single pressure sensor 15*a* is arranged in the hydraulic line 17 between the hydraulic reservoir, which is not shown, and the respective supply line 17*a* of the respective hydraulic cylinder 10*a, b*. In other words, the single pressure sensor 15*a* is connected to the pressure line of the hydraulic line 17, which is marked with the reference sign P in the Figures and includes the supply line 17*a*. In the event that the pressure on the ring side of the hydraulic cylinder 10*a, b* increases during operation, the hydraulic fluid within the supply line 17*a* is forced against the stop valve 19. In other words, the hydraulic fluid column rests on the stop valve 19 and the actual pressure on the ring surface area of the hydraulic cylinder 10*a, b* has a higher value than the pressure measured by the pressure sensor 15*a*. Consequently, the multi-way valve 18*a* or the multi-way valve 18*b* may be opened to equalize the pressure. In this case, equalization of the pressures in the pressure line and the ring surface area of the hydraulic cylinder 10*a, b* is accomplished, since in both cases hydraulic fluid can flow out of the pressure line.

It is understood that features mentioned in the previously described embodiments are not limited to these particular combinations and are also possible in any other combinations. Furthermore, it is understood that geometries shown in the Figures are only exemplary and are also possible in any other embodiments.

The invention claimed is:

1. A control and/or regulating system for an agricultural device including a distributor linkage for spreading material, such as fertilizer, pesticide or seed, which extends transversely to the direction of travel and has a central part and two lateral arms connected to the central part with a plurality of arm sections which are foldable in towards one another in the transport position and foldable out in the working position and are connected by joints, wherein comprising:

at least one hydraulic device associated with each arm, wherein the hydraulic device is controllable for damping vibrations occurring at the distributor linkage in horizontal and/or vertical direction, and wherein the hydraulic device comprises a double- acting hydraulic cylinder;

a sensor device configured to detect a pressure change occurring at a respective hydraulic device due to vibrations in the horizontal and/or vertical direction of the distributor linkage, wherein the sensor device comprises a first pressure sensor and a second pressure sensor, wherein the first pressure sensor is configured to detect a first pressure associated with a pressure on the side of a ring surface area of the hydraulic cylinder of the respective hydraulic device, and wherein the second pressure sensor is configured to detect a second pressure associated with a pressure on the side of a piston surface area of the hydraulic cylinder of the respective hydraulic device; and a data processing unit configured to process signals of the sensor device and, on the basis thereof, to generate a control signal for the respective hydraulic device, wherein the control signal is generated by taking into account a pressure offset corresponding to a pressure difference between the pressure chambers of the respective hydraulic cylinder in a target position of the distributor linkage, and, wherein the pressure offset is determined based on signals from the first pressure sensor and the second pressure sensor.

2. The control and/or regulating system according to claim 1, wherein, for determining the pressure offset, the signals of the sensor device are processed by filtering by means of a low-pass filter.

3. The control and/or regulating system according to claim 1, wherein the data processing unit is configured to process the signals of the first sensor and the second sensor in particular taking into account the ratio of the ring surface area and the piston surface area of the hydraulic cylinder so as to generate the control signal for the respective hydraulic device.

4. The control and/or regulating system according to claim 3, wherein the data processing unit is configured to:

determine a plurality of pressure difference values based on the signals of the first sensor and the second sensor while taking into account the ratio of the ring surface area and the piston surface area of the hydraulic cylinder, applying a filter, in particular a low-pass filter, to the plurality of pressure difference values, and determine the pressure offset based on the filtered pressure difference values.

5. The control and/or regulating system according to claim 1, wherein the respective hydraulic device further comprises:

a hydraulic line connected to the hydraulic cylinder for supplying hydraulic fluid; and at least one hydraulic valve unit for controlling the hydraulic pressure, wherein the valve unit is controllable via a control signal of the data processing unit.

6. The control and/or regulating system according to claim 5, wherein the at least one hydraulic valve unit is formed by a proportional valve.

7. The control and/or regulating system according to claim 1, wherein the first sensor is configured to detect a pressure associated with a common pressure on the side of the ring surface area of all hydraulic cylinders of the system.

8. The control and/or regulating system according to claim 1, further comprising further sensors on the distributor linkage configured to determine a rotation about a folding axis and/or a position of an arm section and/or arm, wherein the data processing unit is configured to generate the control signal based on the determined rotation and/or position.

9. The control and/or regulating system according to claim 1, wherein the hydraulic device is configured to transfer the distributor linkage from a transport position to a working position and vice versa.

10. An agricultural device for spreading material, such as fertilizer, pesticide or seed, comprising a control and/or regulating system according to claim 1.

11. A method for controlling and/or regulating an agricultural device including a distributor linkage for spreading material, such as fertilizer, pesticide or seed, which extends transversely to the direction of travel and has a central part and two lateral arms connected to the central part with a plurality of arm sections which are foldable in towards one another in the transport position and foldable out in the working position and are connected by joints, wherein at least one respective hydraulic device is associated with each arm, wherein the respective hydraulic device is controllable for damping vibrations occurring at the distributor linkage in horizontal and/or vertical direction, and wherein the respective hydraulic device comprises a hydraulic cylinder, in particular a double-acting hydraulic cylinder, wherein the method comprises:

detecting, by a sensor device, a pressure change occurring at the respective hydraulic device due to vibrations in the horizontal and/or vertical direction of the distributor linkage; and generating, on the basis of the detected pressure change, a control signal for the respective hydraulic device, wherein the control signal is generated by taking into account a pressure offset corresponding to a pressure difference between a ring surface area and a piston surface area of the hydraulic cylinder in a target position of the distributor linkage, wherein the pressure offset is determined based on signals from the sensor device.

12. The method according to claim 11, wherein the signals of the sensor device are processed by filtering by means of a low-pass filter.

13. The method according to claim 11, further comprising:

detecting a first pressure associated with a pressure on the ring surface area of the hydraulic cylinder;

detecting a second pressure associated with a pressure on the piston surface area of the hydraulic cylinder;

processing the first pressure and the second pressure by taking into account the ratio of the ring surface area and the piston surface area of the hydraulic cylinder; and generating the control signal for the respective hydraulic device based on the processed pressure values.

14. The method according to claim 13, further comprising:

determining a plurality of pressure difference values based on the first pressure and the second pressure by taking into account the ratio of the ring surface area and the piston surface area of the hydraulic cylinder;

applying a filter, in particular a low pass filter, to the plurality of pressure difference values; and determining the pressure offset based on the filtered plurality of pressure difference values.

15. The method according to claim 13, wherein the first pressure is associated with a common pressure on the ring surface areas of all hydraulic cylinders of the hydraulic cylinder of the system.

16. The method according to claim 11, further comprising:

determining a rotation about a folding axis and/or a position of an arm section and/or arm; and generating the control signal based on the determined rotation and/or position.

* * * * *